March 26, 1963  W. T. ROBINSON  3,082,987
OUTLET BOX SUPPORTS
Filed July 28, 1960
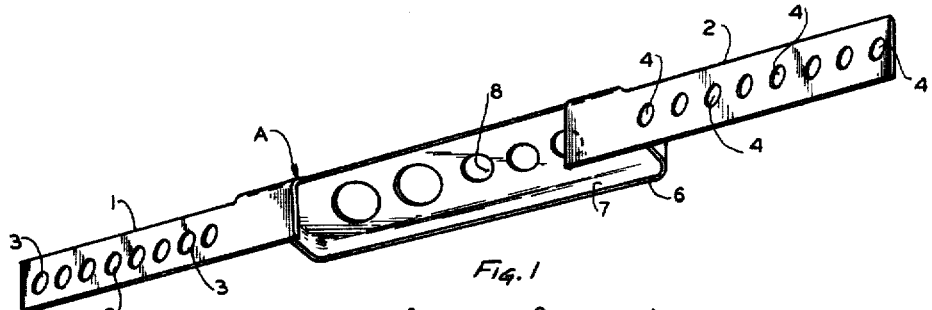
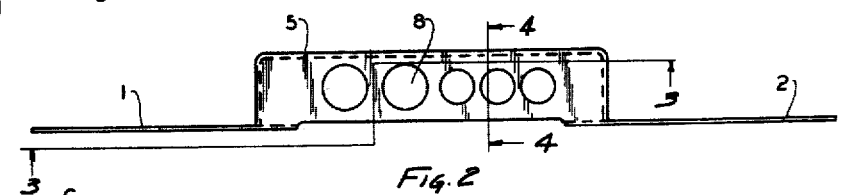
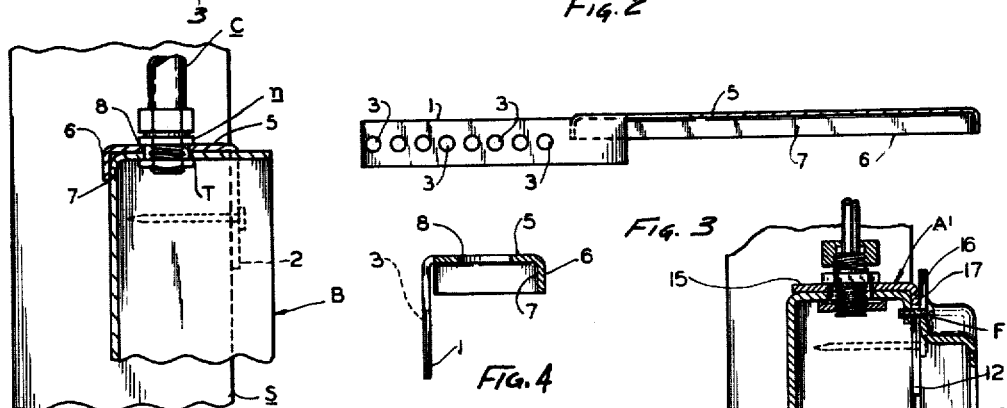
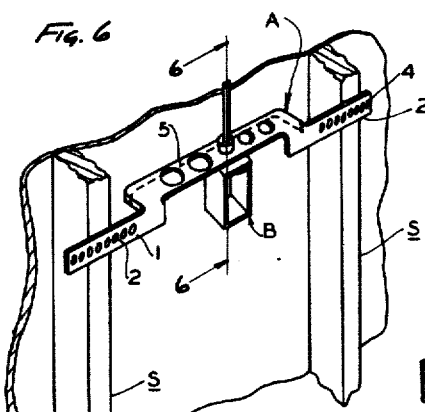
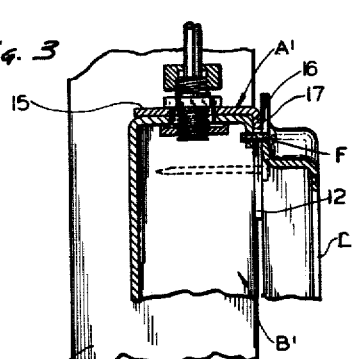
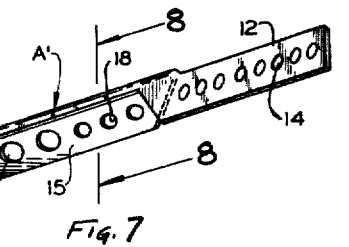
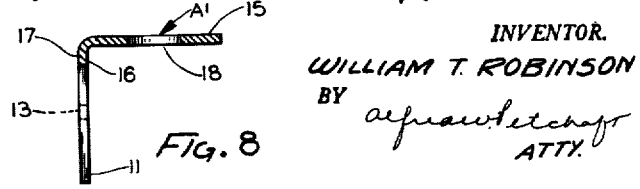
INVENTOR.
WILLIAM T. ROBINSON
BY
ATTY.

United States Patent Office 3,082,987
Patented Mar. 26, 1963

3,082,987
OUTLET BOX SUPPORTS
William T. Robinson, 709 N. 79th St., East St. Louis, Ill.
Filed July 28, 1960, Ser. No. 45,886
10 Claims. (Cl. 248—205)

This invention relates in general to certain new and useful improvements in electrical wiring devices and, more particularly, to outlet box supports.

In the construction of buildings and, more particularly, in residential construction, it is quite common to use studding in the construction of walls. Such studding may be made of either wood or metal cut to appropriate length and set in vertical position along the line of the wall at approximately sixteen-inch intervals. Studding is suitably cross-braced by horizontal members inserted between the vertical members. The horizontal brace members are ordinarily spaced from four to six feet apart vertically and rarely, if ever, are in suitable position to serve as supports for outlet boxes, conduit boxes, junction boxes, and the like, which are utilized in installing the electrical wiring. In ordinary building practice, the electrical wiring is usually installed after all of the studding and wall framing is in place and, ordinarily, the electrical wiring system consists of insulated electrical conductors which are enclosed in an outer plastic and fiber sheath, in which case the sheathed conductors are conventionally referred to as "Romex." In many cases, ordinary insulated wires are pulled through lightweight metallic tubing, which is usually referred to as "conduit." Regardless of whether "Romex" or "conduit" is used, the conductors always extend into and terminate within a metallic box which is commonly referred to in the electrical trade as either an outlet box, junction box, or the like, depending upon the particular function which the box will serve. When a wall switch, or outlet, or similar receptacle, is ultimately to be installed in the box, it is usually referred to as an outlet box. For some types of work, a full depth outlet box is used. For other types of work a somewhat shallower box is used and is fitted with a so-called plaster ring.

These outlet boxes must be rigidly suspended between two adjacent pieces of studding at an appropriate height above the floor and in such position as required by the architectural plans. Moreover, the open face of the outlet box or the outlet box-plaster ring assembly must be flush, or at least substantially flush, with the finished surface of the plastered wall after the plastering has been completed, or in the case of dry-wall construction, must be substantially flush with the outer or finished surface of the dry wall when the studding is covered with wall board utilized in this so-called dry-wall type of construction. Heretofore, it has been the practice to locate and nail up wooden cross pieces between the studding at the approximate location in which the outlet box must be positioned. In addition to this, the wooden braces are not always placed accurately and frequently are installed in such a manner as to add to the difficulty of the subsequent installation of the outlet box when the electrician comes on the job.

It is, therefore, the primary object of the present invention to provide a metal support for outlet boxes which is relatively universal in its adaptability to the varying needs and requirements of a construction job and can be quickly and expediently installed by the electrician as he is setting up outlet boxes during the course of an electrical wiring installation.

It is another object of the present invention to provide a support for outlet boxes which is simple and economical in construction and contributes materially to reducing the cost of an electrical wiring installation.

It is also an object of the present invention to provide an outlet box holder of the type stated which is extremely rigid, durable, and easy to install.

It is a further object of the present invention to provide an outlet box support of the type stated which is lightweight and compact in form so that a large number of the outlet box supports may be carried from place to place by an electrician without undue inconvenience.

With the above and other objects in view, my invention resides in the novel features of form, construction, arrangement, and combination of parts presently described and pointed out in the claims.

In the accompanying drawing:

FIG. 1 is a perspective view of an outlet box support constructed in accordance with embodying the present invention;

FIG. 2 is a bottom plan view of the outlet box support shown in FIG. 1;

FIGS. 3 and 4 are fragmentary sectional views taken along lines 3—3 and 4—4, respectively, of FIG. 2;

FIG. 5 is a perspective view of a section of wall studding showing the manner in which a length of conduit and an outlet box is installed therein by use of outlet box supports embodying the present invention;

FIG. 6 is a fragmentary sectional view taken along line 6—6 of FIG. 5;

FIG. 7 is a perspective view of a modified form of outlet box support constructed in accordance with and embodying the present invention;

FIG. 8 is a fragmentary sectional view taken along line 8—8 of FIG. 7; and

FIG. 9 is a fragmentary sectional view similar to FIG. 6 showing the outlet box support in conjunction with an outlet box-plaster ring assembly.

Referring now in more detail and by reference characters to the drawing which illustrates practical embodiments of the present invention, A designates an outlet box support which is stamped or otherwise suitably formed from a single piece of heavy gauge sheet metal and integrally includes two flat oblong-rectangular side-bars 1, 2, each being provided with a plurality of uniformly spaced apertures 3, 4, respectively. The apertures 3, 4, are of relatively small diametral size and preferably of such size as will accommodate the shank of a ten penny common nail.

Integrally joined to the upper interior marginal portions of the side-bars 1, 2, and overlapping them for a distance of approximately an inch is a horizontal box-holding flange 5, which, in effect, holds the side-bars 1, 2, in endwise aligned longitudinally spaced relationship and spans the gap therebetween. Around its two side margins and across its rear margin, the flange 5 is provided with a continuous depending rim 6 having a forwardly presented abutment face 7 which is spaced rearwardly from the forwardly presented faces of the side-bars 1, 2, by a distance approximately equal to the depth of the outlet box B, allowing a sufficient forwardly projecting margin on the outlet box B so that the peripheral portion thereof around its open end will be approximately flush with the finished wall surface, as may be best seen in FIG. 6. Inasmuch as outlet boxes are of standard dimensions, it is possible to standardize on the width of the flange 5 and the relative distances between the forwardly presented faces of the side-bars 1, 2, and the abutment face 7 of the flange 5, so that when the outlet box support is nailed up across two adjacent studding members s as shown in FIG. 5 the conduit box B may be properly positioned by mounting it in such a manner that its rear face abuts against the abutment face 7. The flange 5 is provided with a plurality of apertures 8 which may be all of the same size or may be of different sizes, if desired, but, in either case, are of sizes which will accommodate standard coupling nuts by which conduits are secured to outlet boxes or by which Romex cable is fastened to outlet boxes. These latter fittings are standard in the electrical trade and are not specifically described herein.

In use, the outlet box support A is manually held in a more or less horizontal position across the studs s at the proper distance above the floor and shifted from side to side until one of the apertures 8 is concentrically aligned with the vertical run of conduit c coming down from the ceiling. The conduit c has already been provided with a coupling nut n and, therefore, the outlet box A can be slipped upwardly so that the selected aperture 8 fits around the depending threaded end of the coupling nut n. In this assembled position, the outlet box support A can be shifted a little to one side or the other and tilted one way or the other until the run of conduit c is as nearly vertical as can be correctly sighted by the eye and until the outlet box support A itself is as nearly horizontal as can be sighted by the eye, in which vertical and horizontal positions the outlet box holder A and the conduit c will be in sufficiently accurate position for all building requirements. Thereupon, nails can be driven through the apertures 3, and 4 which happen to lie across the outwardly presented faces of the studs s to secure the conduit box support A firmly in place. It will be noted, in this connection, that the holes or apertures 3, 4, are sufficiently close together so that at least two of them will lie across each stud face and, if desired, two nails can be used in each of the side-bars 1, 2, so that the entire outlet box support will be held in place by four nails. Of course, in most instances, two nails will be sufficient for all practical purposes. Finally, the conduit box B is slipped up over the depending threaded end of the coupling nut n and secured in place by means of the conventional internally threaded coupling collar T, which, incidentally, tightly binds the upper wall of the outlet box B, the flange 5 and the downwardly presented abutment shoulder of the coupling nut n securely together as a unit. Thus, it will be evident that the outlet box support A not only holds the outlet box B firmly in the desired position but also stabilizes the lower end of the conduit c.

It is also possible to provide a modified form of outlet box support A', as shown in FIG. 7, which is substantially similar to the previously described outlet box support A and is stamped from heavy gauge sheet metal, the form of the outlet box support A' being designed to nest in such a manner on the flat sheet from which it is stamped so as to achieve maximum economy of metal in the course of the stamping process.

The outlet box support A' consists of two oblong rectangular side-bars 11, 12, respectively provided with horizontally spaced series of small holes or apertures 13, 14, and being integrally joined to each other in endwise spaced alignment across overlapping right-angular bend sections to a horizontal flange 15, which is provided across its forward margin with a short down-turned front flange 16 having a forwardly presented abutment face 17. Across its length, the flange 15 is provided with a suitably spaced series of large apertures 18 adapted for receiving the threaded ends of standard coupling nuts. As in the case of the previously described outlet box support A, the abutment face 17 is spaced horizontally from the forwardly presented faces of the side-bars 11, 12, by the proper distance so that the forward open end of the outlet box will be held in proper position for flush alignment with the finished surface of the wall in which the outlet box is being mounted.

The outlet box support A' may be installed and used in substantially the same manner as previously described in connection with the outlet box support A.

It is also possible, as shown in FIG. 9, to employ the outlet box support A' with a shallow-type outlet box B' having a plaster ring r conventionally secured to the box B by screws f. It will be noted that the flange 16 of the support A' is engaged clampwise between the box B' and the upper part of the plaster ring r.

It should be understood that changes and modifications in the form, construction, arrangement, and combination of the several parts of the outlet box supports may be made and substituted for those herein shown and described without departing from the nature and principle of my invention.

Having thus described my invention, what I claim and desire to secure by Letters Patent is:

1. A support for electrical wiring devices in the nature of junction boxes, outlet boxes, and the like, said support comprising a first member integrally provided at its outer ends with longitudinally outwardly extending mounting members disposed in a plane which is at an angle to the plane of the first member, said mounting members having inwardly projecting coplanar extensions which project inwardly from the outer ends of said first member, said coplanar extensions terminating in spaced opposed margins, said first member being provided with a downwardly projecting rim member below its surface for engagement with the wiring device whereby to position said device upon the surface of the first member at a predetermined position in relation to the mounting members.

2. A support for electrical wiring devices in the nature of junction boxes, outlet boxes, and the like, said support comprising a first member integrally provided at its outer ends with longitudinally outwardly extending mounting members disposed in a plane which is perpendicular to the plane of the first member, said mounting members having inwardly projecting coplanar extensions which project inwardly from the outer ends of said first member, said coplanar extensions terminating in spaced opposed margins, said first member being provided with a downwardly projecting rim member below its surface for engagement with the wiring device whereby to position said device upon the surface of the first member at a predetermined position in relation to the mounting members.

3. A support for electrical wiring devices in the nature of junction boxes, outlet boxes, and the like, said support comprising a first member integrally provided at its outer ends with longitudinally extending mounting members disposed in a plane which is at an angle to the plane of the first member, said mounting members having inwardly projecting coplanar extensions which project inwardly from the outer ends of said first member, said coplanar extensions terminating in spaced opposed margins, the spaced opposed margins of the mounting members being in a plane that is perpendicular to the plane of the first member.

4. A support for electrical wiring devices in the nature of junction boxes, outlet boxes, and the like, said support comprising a first member integrally provided at its outer ends with longitudinally extending mounting members disposed in a plane which is at an angle to the plane of the first member, said mounting members having inwardly projecting coplanar extensions which project inwardly from the outer ends of said first member, said coplanar extensions terminating in spaced opposed margins, said first member being provided with a depending rim projecting below its surface for engagement with the wiring device whereby to position said device upon the surface of the first member at a predetermined position in relation to the mounting members, said depending rim being substantially parallel to the plane of the mounting members.

5. A support for electrical wiring devices in the nature of junction boxes, outlet boxes, and the like, said support comprising a first flat member having four outer margins, said first member being integrally provided along the outer ends of one of its margins with longitudinally extending mounting members disposed in a plane which is at an angle to the plane of the first member, said mounting members having inwardly projecting coplanar extensions which project inwardly from the outer ends of said first member, said coplanar extensions terminating in spaced opposed margins, said first member being integrally provided along the remaining three of its margins with a depending rim for engagement with the wiring device whereby to position said device upon the surface of the first member at a predetermined position in relation to the mounting members.

6. A support for electrical wiring devices in the nature of junction boxes, outlet boxes, and the like, said support comprising a first flat member having four outer margins, said first member being integrally provided along the outer ends of one of its margins with longitudinally extending mounting members disposed in a plane which is perpendicular to the plane of the first member, said mounting members having inwardly projecting coplanar extensions which project inwardly from the outer ends of said first member, said coplanar extension terminating in spaced opposed margins, said first member being integrally provided along the remaining three of its margins with a depending rim for engagement with the wiring device whereby to position said device upon the surface of the first member at a predetermined position in relation to the mounting members.

7. A support for electrical wiring devices in the nature of junction boxes, outlet boxes, and the like, said support comprising a first flat member having four outer margins, said first member being integrally provided along the outer ends of one of its margins with longitudinally extending mounting members disposed in a plane which is perpendicular to the plane of the first member, said mounting members having inwardly projecting coplanar extensions which project inwardly from the outer ends of said first member, said coplanar extensions terminating in spaced opposed margins, said first member being integrally provided along the remaining three of its margins with a depending rim for engagement with the wiring device whereby to position said device upon the surface of the first member at a predetermined position in relation to the mounting members, the portions of the rim on two margins adjacent the margin with mounting members being sized to abut the extensions of said mounting members.

8. A support for electrical wiring devices in the nature of junction boxes, outlet boxes, and the like, said support comprising a first flat member having four outer margins, said member being integrally provided along the outer ends of one of its margins with longitudinally extending mounting members disposed in a plane which is perpendicular to the plane of the first member, said mounting members having inwardly projecting coplanar extensions which project inwardly from the outer ends of said first member, said coplanar extensions terminating in spaced opposed margins, said first member being integrally provided along one of the margins which is parallel to the margin with the mounting members with a depending rim for engagement with the wiring device whereby to position said device upon the surface of the first member at a predetermined position in relation to the mounting members.

9. A support for electrical wiring devices in the nature of junction boxes, outlet boxes, and the like, said support comprising a first flat member having four outer margins, said first member being integrally provided along the outer ends of one of its margins with longitudinally extending mounting members disposed in a plane which is perpendicular to the plane of the first member, said mounting members having inwardly projecting coplanar extensions which project inwardly from the outer ends of said first member, said coplanar extensions terminating in spaced opposed margin, said first member being integrally provided along one of the margins which is parallel to the margin with the mounting members with a depending rim for engagement with the wiring device whereby to position said device upon the surface of the first member at a predetermined position in relation to the mounting members, the spaced opposed margins of the extensions lying in respective planes which are oblique to each other.

10. A support for electrical wiring devices in the nature of junction boxes, outlet boxes, and the like, said support comprising a first flat member having four outer margins, said first member having a plurality of various sized apertures, said first member also being integrally provided along the outer ends of one of its margins with longitudinally extending mounting members disposed in a plane which is perpendicular to the plane of the first member, said mounting members having inwardly projecting coplanar extensions which project inwardly from the outer ends of said first member, said coplanar extensions terminating in spaced opposed margins, said first member being integrally provided along the remaining three of its margins with a depending rim for engagement with the wiring device whereby to position said device upon the surface of the first member at a predetermined position in relation to the mounting members.

References Cited in the file of this patent

UNITED STATES PATENTS

| | | |
|---|---|---|
| 949,576 | Hunter | Feb. 15, 1910 |
| 1,404,958 | Hobbs | Jan. 31, 1922 |
| 1,515,216 | Kissinger | Nov. 11, 1924 |
| 1,667,025 | Bowers | Apr. 24, 1928 |
| 1,814,449 | Morgenstern | July 14, 1931 |
| 1,910,231 | Barnett | May 23, 1933 |
| 2,328,421 | Carlson | Aug. 31, 1943 |
| 2,350,433 | Vernon | June 6, 1944 |
| 2,878,955 | Hagan | Mar. 24, 1959 |

FOREIGN PATENTS

| | | |
|---|---|---|
| 709,484 | France | May 18, 1931 |

UNITED STATES PATENT OFFICE
CERTIFICATE OF CORRECTION

Patent No. 3,082,987 March 26, 1963

William T. Robinson

It is hereby certified that error appears in the above numbered patent requiring correction and that the said Letters Patent should read as corrected below.

Column 5, line 45, after "said" insert -- first --; column 6, line 14, for "margin" read -- margins --.

Signed and sealed this 22nd day of October 1963.

(SEAL)
Attest:

ERNEST W. SWIDER
Attesting Officer

EDWIN L. REYNOLDS

Acting Commissioner of Patents